United States Patent [19]
Sanders et al.

[11] Patent Number: 5,560,946
[45] Date of Patent: Oct. 1, 1996

[54] READY-TO-BAKE DOUGHS

[75] Inventors: Johannes C. Sanders, Vlaardingen; Maria J. Hemelaar, Rotterdam; Jacobus Dijkshoorn, Vlaardingen; Daniëlle G. Hameleers-v. Bilsen, Utrecht, all of Netherlands

[73] Assignee: Van den Bergh Foods Co., Division of Conopco, Inc., Lisle, Ill.

[21] Appl. No.: 359,756

[22] Filed: Dec. 20, 1994

[30] Foreign Application Priority Data

Dec. 22, 1993 [EP] European Pat. Off. ............ 93203627
Aug. 16, 1994 [EP] European Pat. Off. ............ 94202330

[51] Int. Cl.⁶ .................................................. A21D 13/08
[52] U.S. Cl. ..................... 426/94; 426/275; 426/559; 426/560; 426/576; 426/578; 426/604; 426/654; 426/661
[58] Field of Search ........................... 426/94, 560, 275, 426/661, 559, 578, 576, 654, 604

[56] References Cited

U.S. PATENT DOCUMENTS

| | | | |
|---|---|---|---|
| 1,493,685 | 5/1924 | Lindsey et al. | 426/576 |
| 2,919,986 | 1/1960 | Johnson . | |
| 3,851,081 | 11/1974 | Epstein | 426/559 |
| 4,324,811 | 4/1982 | Eugley | 426/656 |
| 4,859,484 | 8/1989 | Bielskis et al. | 426/578 |
| 4,885,180 | 12/1989 | Cochran et al. . | |
| 5,167,975 | 12/1992 | Tsurumaki et al. . | |

FOREIGN PATENT DOCUMENTS

| | | |
|---|---|---|
| 0493850 | 7/1992 | European Pat. Off. . |
| 0561702 | 9/1993 | European Pat. Off. . |
| 0559544 | 9/1993 | European Pat. Off. . |
| PCT/EP94/04165 | 12/1993 | European Pat. Off. . |
| 41 18 024 | 10/1992 | Germany . |
| WO92/18010 | 10/1992 | WIPO . |
| WO93/22928 | 11/1993 | WIPO . |

OTHER PUBLICATIONS

European Search Report in European Patent Application 93203627.0.
Derwent Abstract of EP 0 561 702.
Derwent Abstract of EP 0 559 544.
Derwent Abstract of WO92/18010.
Derwent Abstract of DE 4 118 024.

*Primary Examiner*—Helen Pratt
*Attorney, Agent, or Firm*—Gerard J. McGowan, Jr.

[57] ABSTRACT

Improved ready-to-bake frozen, laminated doughs comprise:
  a flour component and, based on the weight of the flour:
    45–70 wt. % water
    5–10 wt. % yeast
    0.1–4.0 wt. % emulsifier
  the flour-component being composed of:
    80–99 wt. % natural flour
    20–1 wt. % artificial flour
  the artificial flour consisting of:
    30–70 wt. % protein
    70–30 wt. % modified starch
The laminated product has 8–80 fatlayers and contains, based on the weight of the flour, 35–85 wt. % fat.

9 Claims, No Drawings

READY-TO-BAKE DOUGHS

In order to come to more convenient dough-systems, that enables a baker to prepare a dough on one day and to bake a dough-product made from it on a later day, several solutions have been given in the prior art. In our European Patent 493,850 we have disclosed preproofed, frozen croissants that can be baked without thawing, that contain a gelatin-relating compound in order to retain the $CO_2$, developed by the proofing in the frozen dough-system. Above products however, mean that a proofing-process has still to be performed resulting in frozen, proofed dough-systems that are very vulnerable during transportation. Moreover the total volume that must be transported is higher for proofed than for unproofed doughs.

An even more convenient solution would be, if dough systems could be found that contain a leavener, such as yeast, but that do not need to be preproofed. After freezing of the dough-system it should be possible to obtain baked products with good specific volume and ovenspring without thawing and proofing of the dough system prior to baking. In the prior art some systems and processes are disclosed, which would lead to such so called ready-to-bake dough systems. E.g. in WO 92/18010 or DE 4,118,024 laminated dough-systems are disclosed, wherein a dough is made from flour, yeast and liquid, the dough is kneaded and laminated with fat. Essential is that the fat is not present in the dough, but is only incorporated in the laminated product as laminate-fat. Another essential feature of the products and the process is, that the number of fatlayers present in the laminated dough, is increased with 10 to 50%, compared with the normal number of 12 to 36 fatlayers present in the conventional laminated dough-systems. Simultaneously the amount of yeast applied is 10–50% higher than conventionally applied. We found that above process leads to products that display slightly better specific volumes and ovenspring than products made according to the more conventional techniques. However, the s.v. and ovenspring of the products were still inacceptably low for the baker and the consumer (see our comparative examples). Another solution was presented in EP 561,702. According to this patent-application ready-to-bake frozen croissants were made, wherein the total amount of fat-layers was greater than 50. Those products can contain three additives, i.e.

an acidifier a thickener or gelatinizing agent a lipolytic enzyme.

As examples of the thickeners and gelatinizing agents are mentioned: carboxymethyl cellulose (also illustrated in the example), guar gum, xanthan or alginate. We found (cf. our comparative examples) that products made according to this EP-application did not yet meet the standards set by the baker and the consumer.

Therefore we performed a study in order to find out, whether we could make ready-to-bake, frozen, laminated doughs that display upon baking (without thawing and proofing) an ovenspring of at least 2.2 ml/g and in particular at least 4.5 ml/g (using:50 gram product). The products obtained after baking should display specific volumes of at least 3.5 ml/g, preferably at least 5 ml/g and in particular at least 6 ml/g (again using: 50 gram product). This study resulted in our invention. We found that such products can be obtained, when the flour-component of our dough is constituted of two components, i.e. 1) of a natural flour and 2) of an artificial flour. The artificial flour being composed of a protein, in particular a gelatin-relating compound and a modified starch.

Therefore, our invention concerns ready-to-bake, frozen, laminated dough, comprising consecutive layers of dough and fat, wherein the dough comprises:

a flour-component, and (on flour):

45–70 wt. % of water

5–10 wt. % of yeast 0.1–4.0 wt. % of emulsifier wherein the flour-component is composed of:

80–99 wt. % of natural flour and

20–1 wt. % of "artificial flour"

and wherein the artificial flour consists of:

30–70 wt. % of a protein, in particular a gelatin-relating compound and

70–30 wt. % of a modified starch, while the laminated product contains 8–80, preferably 16–60 fatlayers and the total fat-content of the product (on flour) is 35–85 wt. %, preferably 35–50 wt. %.

As can be concluded from above, it is advantageous when the number of fatlayers present is restricted, while the fat-content of the product is limited. As proteins can be used gluten, whey-proteins, egg-proteins and caseinates and mixtures thereof.

Very suitable products are obtained, when a gelatin-relating compound is applied, in particular if selected from the group, consisting of: gelatin with a bloom-rate of 50–400; non-gelling gelatin with a bloom-rate of 0–50; hydrolyzed gelatin and gelatin-precursors, such as collagen.

The starch-component of our artificial flour must be a modified starch. Preferred modified starches are the heat-stable modified starches, in particular the cross-linked starches. A typical example being a cross-linked waxy maize starch, this starch can either be pregelatinized or not. Suitable modified starches can be selected from the following group (although not restricted to this group) Ultratex-2, Instant Clearjel, Pureflo, Thermflo, National 780188, Firmtex, Hiflo, National Frigex, National Frigex HV, National Frigex L.V.; Purity VL, Collflo 67, Purity HPC, Thermtex (all from National Starch); Clearam CH-30 (from Roquette) and from Avebe the Farinex-type products: VA 70; VA 100T; CAX;TK-1; VA 70 C or CA. Preferred modified starches are derived from waxymaize or from tapioca.

Although any emulsifier can be applied, we found that suitable emulsifiers are mono- and diglycerides; acetic, lactic, citric, tartaric and diacetyl tartaric acid esters of mono- and diglycerides; polyglycerol esters; propylene glycol esters; stearoyl-2-lactylic esters; sorbitan esters and others. We found that a very beneficial effect on product performance is obtained, when the emulsifier comprises a DATA -ester, that provides baking performance to the dough, or a lecithin, or mono fatty acid esters from sucrose, wherein the fatty acids have a chain length of 12–20 C-atoms, or mixtures thereof.

The DATA-ester and the mixture with the lecithin provide in particular improved appearance to the baked products. Very suitable DATA-esters are those, that have a low saponification value (sap. value<450).

The lecithin can be any known sort of lecithin, however, it is preferred to use lecithins that have a high phospholipid-content.

Other dough-improving ingredients, such as sugar, fat, enzymes, in particular xylanase and/or glucoamylase, and/or transglutaminase and/or amylase, ascorbic acid and reducing agents, such as cysteine can also be incorporated in the dough. The amounts are effective amounts, which can be derived from the prior art. Ascorbic acid is used in slightly higher amounts of more than 100 pppm (on flour).

Very suitable laminated doughs, with very good product-performance are obtained, when we apply a specific ratio between fat-content (in % on flour) and number of fatlayers. In fact we found that ratio's of 0.66–1.5 lead to very good results.

The natural flour component of our doughs can be any flour, applicable according to the prior art in laminated dough systems. Preferred flours are strong flours, in particular the flours with at least 15 wt. % protein on dry matter are preferred.

Our new laminated dough systems can also be filled with fillings, such as custards, marmalades, fruit, ham, cheese or chocolate. However, in order to avoid problems with the readiness of the baked products, it is suitable to apply fillings with a reduced water-content and/or to add a food-grade waterbinder to the filling. Very convenient fillings comprise custard-fillings with a water-content of 50–65 wt. %, marmalade-fillings with a water-content of 45–70 wt. %, while these fillings also can contain 2–15 wt. % of a waterbinder, selected from the group, consisting of gelatin, egg-white powder, starches, modified starches, flour, carrageenan, guar gum. Custard-fillings will contain preferably 9–15 wt. % of these waterbinders, while the marmalades preferably will contain 2–8 wt. % thereof. The filling-material can be applied as a pourable filling or as a frozen filling, in particular in the form of a frozen stick.

The ready-to-bake, frozen laminated doughs, according to our invention, produce upon baking for 30 minutes at 210° C. a product with a specific volume (s.v.) of at least 3.5 ml/g, preferably at least 5 ml/g; in particular at least 6 ml/g. Ovensprings, achieved during above baking of the frozen products, are at least 2.2 and most preferably at least 4.5 ml/gram.

EXAMPLES AND COMPARATIVE EXAMPLES

Experiments were carried out, wherein we have compared the following procedures and recipes:

| Exmpl. | recipe | procedure | results s.v. | Appearance | Oven-spring |
|---|---|---|---|---|---|
| 1 | EP 561, 702[1] | EP 561, 702[1] | 4.7 | – | 3.6 |
| 2 | EP 561, 702[2] | EP 561, 702[2] | 3.2 | – | 2.1 |
| 3 | WO 92/18010 | WO 92/18010 | 2.8 | – | 1.7 |
| 4 | Acc Invention | Acc Invention | 5.8 | + | 4.7 |
| 5 | WO 92/18010 | Acc Invention | 3.6 | — | 2.6 |
| 6 | Acc Invention | WO 92/18010 | 5.1 | + | 4.1 |

[1] = without a thickener
[2] = in presence of C.M.C
– = bad
+ = good

The recipes that were applied were as follows:

| A: According to EP 561,702[1]: | |
|---|---|
| Flour: Columbus | 100 wt % |
| Water: | 58 wt % |
| Salt | 2 wt % |
| Konings-yeast | 7.5 wt % |
| Sugar | 8 wt % |
| Total | 175.5 wt % |
| Laminate-margarine | 52.5 wt % | ratio: dough:margarine = 3.3:1

| B: According to EP 561,702[2] | |
|---|---|
| Premix (puff pastry dough) | |
| Flour: Columbus | 100% |
| Water | 60% |
| Salt | 1% |
| CMC-blanose | 0.5% |
| Sugar | 7% |
| Total | 168.5% |
| Yeast-dough: | |
| Flour: Columbus | 100% |
| Water | 60% |
| Salt | 2% |
| Konings-yeast | 7.5% |
| CMC-blanose | 0.5% |
| Improver (Volufrost[R]) | 1.5% |
| Total | 171.5% |
| laminate-margarine | 68 | ratio: dough:margarine = 2.5:1

| C: According to WO 92/18010 | |
|---|---|
| Predough: | |
| Flour: TT-550 | 12.5% |
| Water | 12.75% |
| Sugar | 0.25% |
| Konings-yeast | 0.25% |
| Total | 25.75% |
| Base-dough: | |
| Flour: TT-550 | 87.5% |
| Water | 46% |
| Salt | 0.6% |
| Sugar | 4.5% |

-continued

| C: According to WO 92/18010 | |
|---|---|
| Konings-yeast | 4.5% |
| Water/Lecithin | 4% |
| Total | 143.2% |
| Total-dough 143.2 + 25.75 = 169.95 | |
| Laminate-margarine: | 40 |

Ratio: dough:margarine = 4.2:1

| D: According to invention | |
| --- | --- |
| Flour: Columbus: | 100% |
| Water | 63% |
| Salt | 2% |
| Konings-yeast | 5% |
| sugar | 3% |
| gelatin | 3% |
| Instant Clearjel[R] | 5% |
| Ascorbic acid | 0.02% |
| Enzymes | 0.04% |
| Emulsifier | 0.6% |
| Total | 181.66% |
| Laminate-margarine: | 40 | ratio: dough:margarine = 4.5:1

PROCEDURES

A. According to EP 561,702[1]

A premix was made from flour and sugar; water and yeast were added to the premix and salt was mixed in. The mixture was kneaded during 6 min. at 15° C.

300 grams of margarine was applied as laminate fat for every 1000 g dough. The following lamination-procedure was applied:

1 turn in 3 rolling until 7 mm 3 turns in 3

1 turn in 2 rolling until 3–3.5 mm cutting of a sample of 16×12 cm (dough-weight:50 grams)

moulding of croissants freezing until −30° C. in 1 hour storage at −20° C.

Baking: conventional oven at 210° C. for 28 min. steam was introduced during 5 sec.

B: According to EP 561,702[2]

1. The puff-pastry dough:

A premix was made from the dry-ingredients; water was added to the premix and the mixture was kneaded during 3 min. at 15° C. The dough was rested for 30 min. at 4° C.

2. The yeast-dough

A yeast dough was prepared by mixing of dry ingredients (without yeast and salt). Water and yeast were added to the premix; salt was mixed in and the dough was kneaded for 6 min. at 15° C.

3. Preparation of puff-pastry 1 kg of both doughs were rolled out. The resulting sheets of dough were piled up and 800 grams of margarine were applied on the puff pastry dough.

The following lamination-procedure was applied:

1 turn in 2

3 turns in 3 rolling until 3–3.5 mm cutting of a sample of 16×12 cm (dough weight:50 grams)

moulding of croissants freezing until −30° C. in 1 hour storage at −20° C.

Baking as above:210° C.; 28 min; 5 sec. steam.

C. Procedure of WO 92/18010

1. Predough

The ingredients were mixed for the preparation of a predough. The predough was held at 30°–35° C. for 2 hours. The dough was cooled (fast) until 5° C.

2. Base-dough

A water lecithin mixture (2% lecithin) was made and mixed in into the dough.

The ingredients were mixed during a short time.

3. The predough and the base-dough were kneaded together at 5° C.

4. The following lamination-procedure was performed:

1 turn in 4

1 turn in 3

1 turn in 2 rolling until 2.75 mm cutting of sample of 21×10 cm moulding of croissants freezing until −30° C. in 1 hour storage at −20° C.

5. Baking was performed using a convection oven. T was increased from 150° to 200° C. Time:18.5 min.;1.5 l. steam were introduced.

D: According to the invention

A premix was made (without yeast, enzymes and flour). The flour was added and the mixture was mixed during 5 min. in a Hobart-mixer. The enzymes were dissolved in water and this solution and the yeast were added to the premix. The dough was kneaded for 5 min. at 15° C.

The lamination procedures was as follows:

1 turn in 4

30 min. rest at 15° C.

1 turn in 4

1 turn in 3 rolling until 2.75 mm cutting of sample of 21×10 cm moulding of croissants 30 min. rest at 15° C.

freezing until −30° C. in 1 hour storage at −20° C.

Baking in conventional oven at 210° C.; 28 min, 5 sec. steam.

We claim:

1. A ready to bake, frozen laminated dough, comprising consecutive layers of dough and fat, wherein the dough comprises:

a flour component, and calculated as a percentage of flour:

45–70 wt. % of water,

5–10 wt. % of yeast, 0.1–4.0 wt. % of emulsifier, wherein the flour component includes 80–99 wt. % of natural flour, and 20–1 wt. % of another flour component, and wherein the other flour component includes 30–70 wt. % of a protein and 70–30 wt. % of a modified starch, wherein the laminated product contains 8–80 fat layers and the total fat content of the product, calculated on flour, is 35–85 wt. %.

2. The ready to bake, frozen laminated dough according to claim 1 wherein the protein is a gelatin relating compound selected from the group consisting of gelatin with a bloom rate of 50–400; non-gelling gelatin with a bloom rate of 0–50; hydrolyzed gelatin and gelatin precursors.

3. The ready to bake, frozen laminated dough according to claim 1 wherein the modified starch is a cross linked starch.

4. The ready to bake, frozen laminated dough according to claim 1 wherein the emulsifier comprises:

a diacetyl tartaric acid ester which provides baking performance to the dough, or a lecithin, or mono fatty acid esters from sucrose, wherein the fatty acids have a chain length of 12–20 C-atoms, or mixtures thereof.

5. The ready to bake, frozen, laminated dough according to claim 1 wherein the dough further comprises one or more of the following ingredients:

sugar, fat, enzymes selected from the group consisting of xylanase, glucoamylase, transglutaminase, and amylase, ascorbic acid and reducing agents.

6. The ready to bake, frozen laminated dough according to claim 1 wherein the ratio between fat content, calculated in % of flour and number of fat layers present ranges from 0.66–1.5.

7. The ready to bake, frozen laminated dough according to claim 1, which laminated dough produces upon baking for 30 minutes at 210° C. a product with a specific volume of at least 3.5 ml/g.

8. The ready to bake, frozen laminated dough according to claim 1, which laminated dough displays upon baking for 30 minutes at 210° C. an ovenspring of at least 2.2.

9. The ready to bake frozen laminated dough according to claim 1 wherein the laminated dough is filled with a filling with a reduced water content and/or with an increased content of a food grade water binding agent.

* * * * *